United States Patent [19]
Galaske, Jr.

[11] Patent Number: 5,813,593
[45] Date of Patent: Sep. 29, 1998

[54] TRANSLATIONAL FRICTION WELDING APPARATUS AND METHOD

[75] Inventor: Lawrence J. Galaske, Jr., Hamilton, Ohio

[73] Assignee: General Electric Company, Cincinnati, Ohio

[21] Appl. No.: 749,685

[22] Filed: Nov. 15, 1996

[51] Int. Cl.$^6$ ................................................... B23K 20/12
[52] U.S. Cl. ...................... 228/112.1; 228/2.1; 228/44.3; 29/889.21
[58] Field of Search .................................. 228/2.1, 112.1, 228/44.3; 29/889.21

[56] References Cited

U.S. PATENT DOCUMENTS

| | | |
|---|---|---|
| 4,304,523 | 12/1981 | Cormeiser et al. .................. 29/889.21 |
| 4,377,428 | 3/1983 | Toth . |
| 5,031,288 | 7/1991 | Sadler . |
| 5,035,411 | 7/1991 | Daines et al. . |
| 5,188,275 | 2/1993 | Daines . |
| 5,366,344 | 11/1994 | Gillbanks et al. . |
| 5,486,262 | 1/1996 | Searle . |
| 5,678,749 | 10/1997 | Pratt et al. ............................ 228/112.1 |

FOREIGN PATENT DOCUMENTS

| | | | |
|---|---|---|---|
| 4237052 | 5/1994 | Germany ............................... | 228/44.3 |
| 2277897 | 11/1994 | United Kingdom ................ | 228/112.1 |

*Primary Examiner*—Patrick Ryan
*Assistant Examiner*—Jeffrey T. Knapp
*Attorney, Agent, or Firm*—Andrew C. Hess; Nathan D. Herkamp

[57] ABSTRACT

A device exists for translational friction welding of a first component and a second component. The device includes a holder to hold the first component within an open ended frame having an open space within for receiving the first component. The frame includes a base and transversely spaced apart first and second members which longitudinally extend from the base to an open end of the frame at which is located a clamping feature used to clamp the first component in the holder with a clamping force having force components oriented along three orthogonal axis and has opposing tapering pressure surfaces which open outwardly in a first direction and taper inwardly in a second direction which is perpendicular to the first direction. A sacrificial block on the second component has block ends with surfaces that conforms to the surfaces of one of the clamping features. In a preferred embodiment the clamping feature is a compound wedge shaped notch and the block ends have corresponding compound wedge shapes.

28 Claims, 4 Drawing Sheets

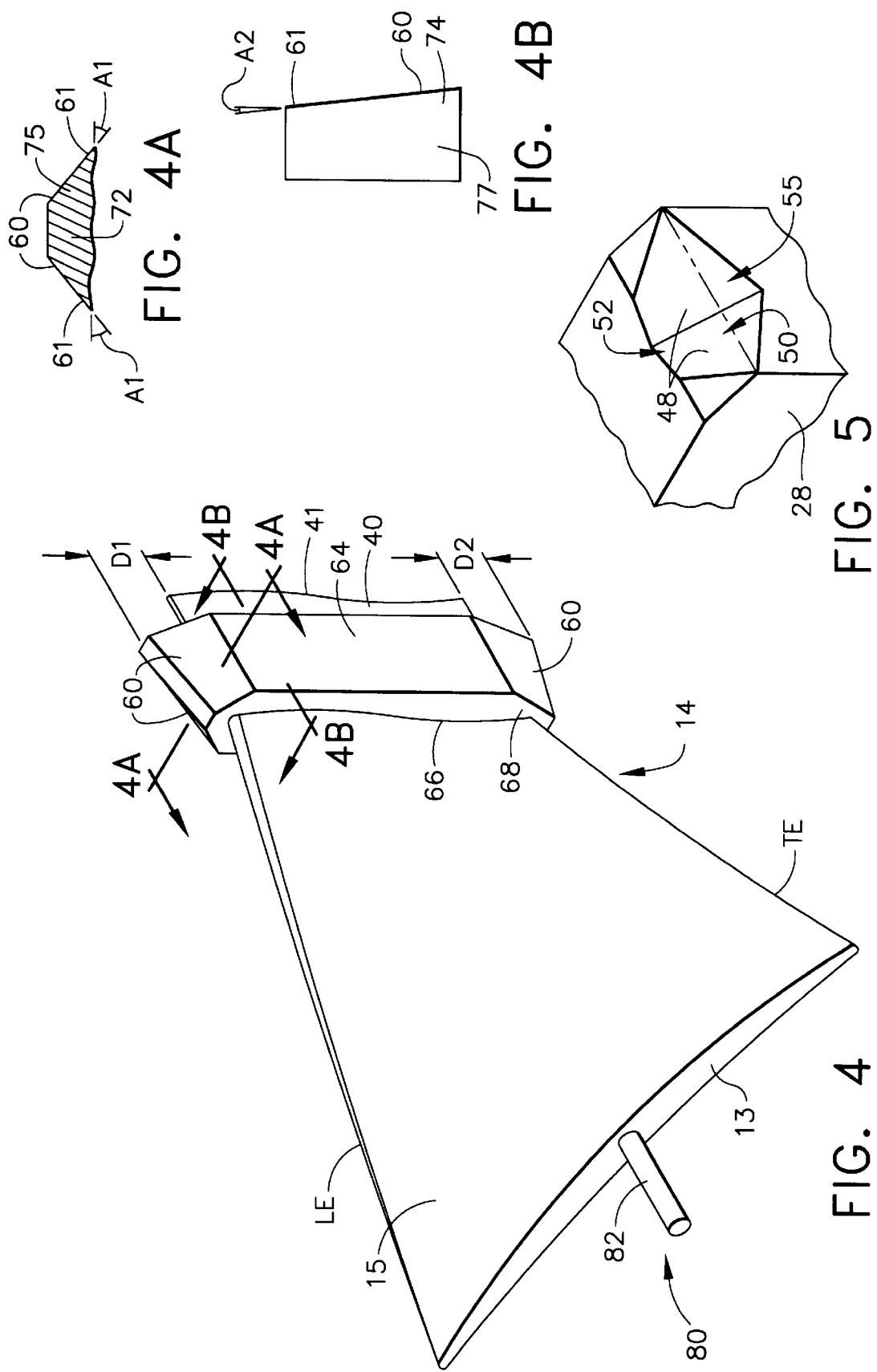

TRANSLATIONAL FRICTION WELDING APPARATUS AND METHOD

BACKGROUND OF THE INVENTION

1. Field of the Invention

The present invention relates to translational friction bonding and, more particularly, to gas turbine engine blade translational friction bonding apparatus and method to bond a blade to a rotor of the engine.

2. Discussion of Background Art

Translational friction welding of components such as gas turbine engine blades to rotors is well known in the manufacture or repair of a integrally bladed disk, sometimes known as a BLISK. A integrally bladed disk is a disk or wheel on the periphery of which there is attached or carried a multiplicity of blades forming a monolithic structure or component. This same technique may also be used to attach a blade to a multi-stage monolithic drum rotor of a gas turbine engine. In a conventional rotor assembly the blades are attached to a disk or wheel by interlocking dovetail attachment methods. In integrally bladed disks and drums the blades are either formed and machined integrally with the disk or drum or are welded or otherwise bonded thereto. The components to be bonded together are linearly or translationally rubbed one against the other with a reciprocating translational motion so that at their interface sufficient heat is generated by friction to effect the weld. Then, an axial welding pressure force is applied to urge the components with a greater force to promote a better weld.

One such a method and device to hold a gas turbine engine blade is disclosed in U.S. Pat. No. 5,035,411 entitled "FRICTION BONDING APPARATUS" by Daines et al., which issued Jul. 30, 1991 while another more bulky apparatus is disclosed in U.S. Pat. No. 5,188,275 entitled "FRICTION BONDING CLAMP FOR A ROTOR BLADE" by Daines, which issued Feb. 23, 1993. Both of these devices provide an apparatus with thin blade enclosures that are not suitable for holding highly twisted blades. Furthermore, neither one uses the machine axial force that produce the necessary friction heating to also provide stabilizing forces in the longitudinal direction of the translational motion for bonding and in the transverse direction as well.

The present invention finds particular application for the manufacture or repair of assemblies in which the inter-blade spacing is very close and the blade airfoils are highly twisted such as in the case of high performance fan and compressor blades mounted on a disk or drum of a rotor. The present invention may also be used for turbine blades. It is highly desirable to be able to translationally friction bond a near net shape blade to a rotor element where the near net shape blade has an airfoil that is substantially fully shaped and needing little further machining, as opposed to a blade blank or preform which requires on the rotor machining to finish shaping the blade airfoil to its final shape after bonding.

The present invention may be used for any irrotational movement for friction welding which may take either of two forms. It may be linear in which case the component is caused to undergo a substantially linear or translational reciprocating motion during the friction heating phase, or it may be an orbital movement in which the moving component follows a closed loop path.

SUMMARY OF THE INVENTION

An apparatus for translational friction welding of a first component and a second component. The apparatus includes a holder to hold the first component within an open ended frame having an open space within for receiving the first component. The frame includes a base and transversely spaced apart first and second members which longitudinally extend from the base to an open end of the frame at which is located a clamping feature. The clamping feature is used to clamp the first component in the holder with a clamping having force components oriented in three directions along three orthogonal axis. The clamping forces are reaction forces due to translational friction welding pressure applied to the first component through the holder in a first direction to press the first component into contact with the second component during translational friction welding and the first direction is substantially opposite along one of the three orthogonal axis.

The clamping feature, preferably, has opposing tapering pressure surfaces which open outwardly in the first direction and taper inwardly in a second direction which is perpendicular to the first direction.

The preferred embodiment of the apparatus has the opposing pressure surfaces cut into the members and the opposing pressure surfaces are flat surfaces having compound angles. Each member has a set of two opposing flat surfaces forming two sides of a pyramidic notch having an open side and an open base and the two open sides face each other. The notch may also be defined as having a compound wedge shape with wedge shaped cross-sections in two sets of orthogonal planes where the wedge shaped cross-sections have at least one inclined or angled side.

The apparatus, preferably, includes a securing assembly for securing the first component to the frame. A preferred embodiment of the apparatus has a securing assembly which includes a receiving aperture in the frame and a threaded aperture in the frame which intersects the receiving aperture, and a set screw threading disposed in the threaded aperture. Alternatively, a clamp may be used for securing the first component to the frame.

The present invention in a more particular embodiment which provides a blade to rotor translational friction welding assembly including a blade having an airfoil extending longitudinally between an airfoil tip and airfoil stub and extending transversely between a leading edge and a trailing edge of the blade and a holder to hold the blade during translational friction welding of the airfoil stub to a rotor stub on a periphery of a rotor element. The holder has an open ended frame for receiving the blade and an open space within which the airfoil is at least partially located and the frame has a base with transversely spaced apart first and second members which longitudinally extend from the base to an open end of the frame. At the open end is located a clamping means for applying pressure to the blade in a first direction away from the base to press the blade's airfoil stub into contact with the rotor stub during translational friction welding and the clamping means has opposing pressure surfaces which open outwardly in the first direction and taper inwardly in a second direction which is perpendicular to the first direction. The blade has contact surfaces oriented to substantially fully contact the pressure surfaces and preferably the contact surfaces are located on at least one sacrificial feature on the blade. The sacrificial feature may be in the form of a block which extends around the airfoil and the contact surfaces are disposed on the block a longitudinally extending distance from one of the leading and trailing edges. The contact surfaces are preferably planar contact surfaces having a compound angle with respect to a flat welding surface on the blade's airfoil stub. Formed on longitudinally distal block ends at positions on the block generally corresponding to the leading and trailing edges of the blade such that each of the block ends has a compound wedge that is wedge shaped in cross-section in two sets of orthogonal planes. The wedge shaped cross-sections have at least one inclined or angled side and one set of the wedge shaped cross-sections lie in planes parallel to the flat welding surface.

The holder, preferably, includes a securing device for securing the blade to the frame. The securing device, preferably, includes a locating pin longitudinally extending from the airfoil tip away from the airfoil and disposed in a receiving aperture disposed in the base, a threaded aperture disposed in the base which intersects the receiving aperture, and a set screw threading disposed in the threaded aperture. Alternatively, the securing device may be a clamp connected to the frame and constructed to clamp the airfoil tip.

The present invention includes methods for using the apparatus of the invention for translational friction welding of a blade to a rotor element. One method includes forming a near net shape blade which has an airfoil extending chordwise between a leading edge and a trailing edge of the blade and extending radially between an airfoil tip and airfoil stub. A flat welding surface is on an end of the airfoil stub extending lengthwise and widthwise and at least one sacrificial clamping feature protrudes from the blade near the end of the airfoil stub. The clamping feature has at least one set of oppositely facing contact surfaces which taper down widthwise in the lengthwise direction outward from the blade and widthwise and lengthwise in a direction normal to the flat welding surface. Then, the blade is placed in a holder having an open ended frame and an open space therein for receiving the airfoil of the blade. The blade is provided with pressure surfaces that conform in shape and orientation to the contact surfaces which are located at the open end of the frame such that the contact surfaces substantially contact the pressure surfaces when the blade is positioned in the holder. Next, the blade is positioned in the holder such that at least a portion of each of the contact surfaces are in contact with a corresponding portion of each of the pressure surfaces. Then, the airfoil stub is translationally friction welded to the rotor stub by simultaneously applying a pressure force on the holder substantially in the direction normal to the flat welding surface while translating the holder in a reciprocating motion substantially in the lengthwise direction. The sacrificial clamping feature is removed after the welding of the airfoil stub to the rotor stub.

The method may include forming the near net shape blade with the clamping feature having a clamping block disposed around a perimeter of the airfoil and each of the block ends having one set of planar oppositely facing contact surfaces at positions corresponding to the leading and trailing edges of the blade such that the block ends have two wedge shaped cross-sections in planes normal to and parallel to the flat welding surface. This clamping feature is removed after the welding of the airfoil stub to the rotor stub.

The method, preferably, includes securing the airfoil to the holder prior to the welding of the airfoil stub to the rotor stub. One method of securing the airfoil includes securing the airfoil to the holder with a sacrificial securing feature on the airfoil that is formed during the formation of the near net shape blade and the securing feature is removed after the welding of the airfoil stub to the rotor stub. The airfoil may be secured to the holder with a securing feature on the airfoil formed during the forming of the near net shape blade and the securing feature is removed after the welding of the airfoil stub to the rotor stub. The securing feature may be a radially extending pin on the airfoil tip and which is at least partially disposed in a locating aperture in a base of the holder and secured to the base by a set screw threadingly tightened in a threaded aperture in the base which is normal to and intersects the locating aperture and the airfoil is secured to the holder by tightening the set screw against the pin.

ADVANTAGES OF THE INVENTION

Among the advantages provided by the present invention is that it allows the use of the axial pressure force and machinery that produces the axial pressure force to also be used to clamp the translating component such as a blade to the holder during the translational friction welding process.

This provides increasing amount of clamping force and stability to the component and the process. Additionally, the invention provides lateral stability as the translating component is reciprocated along longitudinal directions. An additional advantage is that the stability and the clamping force are increased as the axial pressure force is increased.

Another advantage of the present invention is that the wedge action amplifies the lateral and longitudinal stability forces and the clamping forces such that just a small amount of axial pressure force need be reacted out to provide the stability forces and the clamping forces.

Yet another advantage of the present invention is that the wedge action provides self alignment of the component in the holder during the translational friction welding process.

The present invention is more advantageous than the prior art because it allows near net shape objects with highly non planar shapes to be translationally friction welded such as blades having highly twisted airfoils to be welded to rotor elements of gas turbine engines.

The present invention is particularly advantageous for the manufacture or repair of gas turbine engine rotor assemblies in which the interblade spacing is very close and the blade airfoils are highly twisted such as in the case of high performance fan blades mounted on a disk or drum of a rotor.

BRIEF DESCRIPTION OF THE DRAWINGS

The novel features believed characteristic of the present invention are set forth and differentiated in the claims. The invention, together with further objects and advantages thereof, is more particularly described in conjunction with the accompanying drawings in which:

FIG. 4 is a perspective view illustrating in, more detail, the blade and its clamping features in accordance with the exemplary embodiment of the present invention illustrated in FIG. 1;

FIG. 4A is a partial cross-sectional view taken through 4A—4A in FIG. 4;

FIG. 4B is a partial cross-sectional view taken through 4B—4B in FIG. 4; and

FIG. 5 is an enlarged perspective view illustrating, in more detail, the pyramidic notch in the blade holder of the apparatus in FIG. 1.

DETAILED DESCRIPTION

Figure 1:
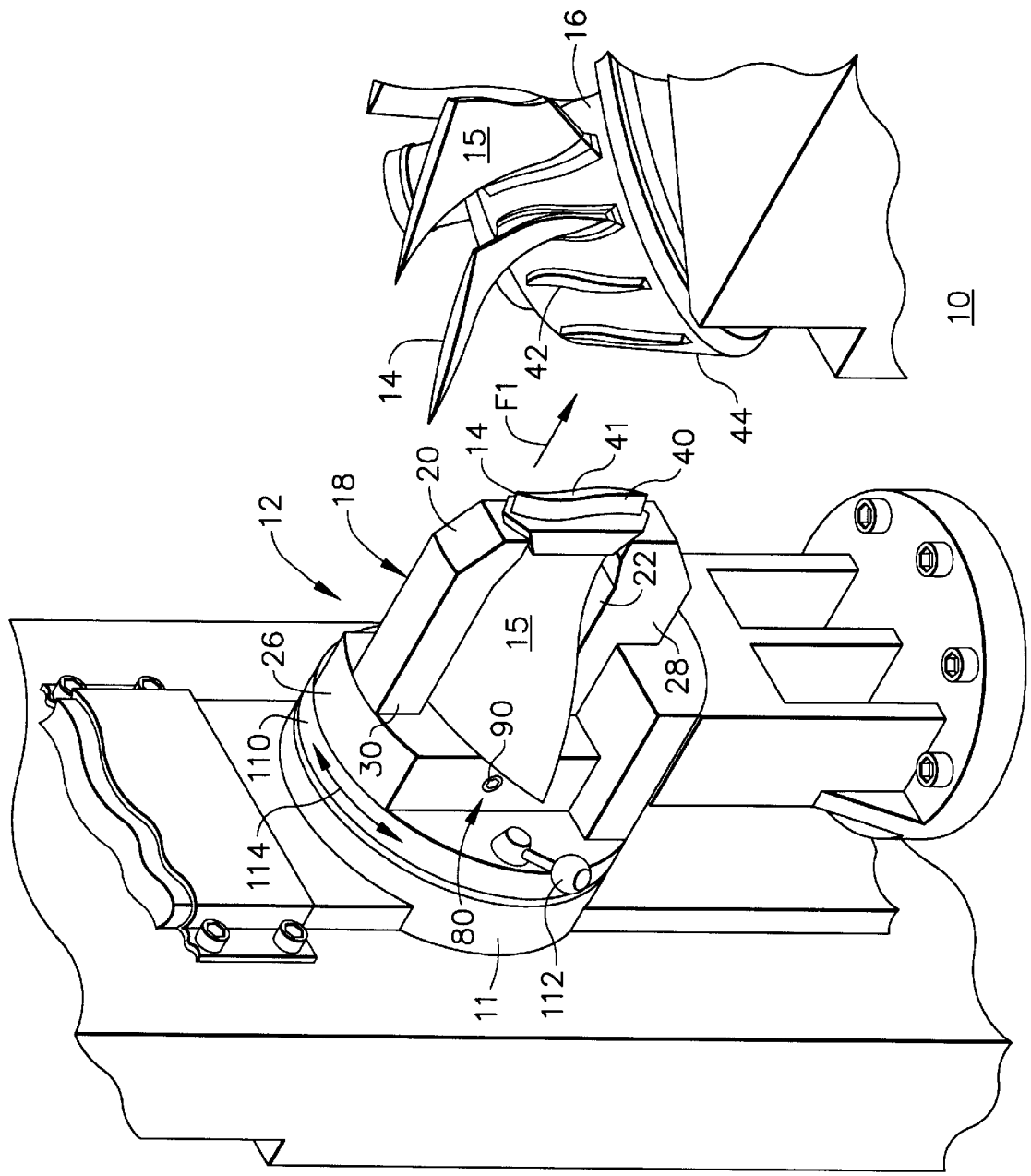
FIG. 1 is a perspective view illustrating a part of a linear friction bonding machine including an apparatus for translational friction welding of a gas turbine engine blade component to a gas turbine engine rotor component in accordance with an exemplary embodiment of the present invention.

Referring now to the drawings in detail wherein identical numerals indicate the same elements throughout the figures. FIG. 1 illustrates a part of a linear friction bonding machine 10 having a headstock 11. The headstock 11 has mounted to it an apparatus 12 for translational friction welding of a first component exemplified by a gas turbine engine blade 14 to a second component exemplified by a gas turbine engine rotor 16 in accordance with an exemplary embodiment of the present invention. The blade 14 has an airfoil 15 extending longitudinally between an airfoil tip 13 and an airfoil stub 40 and extending transversely between a leading edge LE and a trailing edge TE. The airfoil 15 is illustrated as having a high degree of twist for which the present invention has particularly useful features and advantages. The airfoil stub 40 has a flat welding surface 41 at its bottom. Translational friction welding involves reciprocating translational motion of the airfoil stub 40 substantially in a lengthwise direction of the stub which would be along the Y axis in FIG. 2 in the illustrative FIGS.

Figure 3:
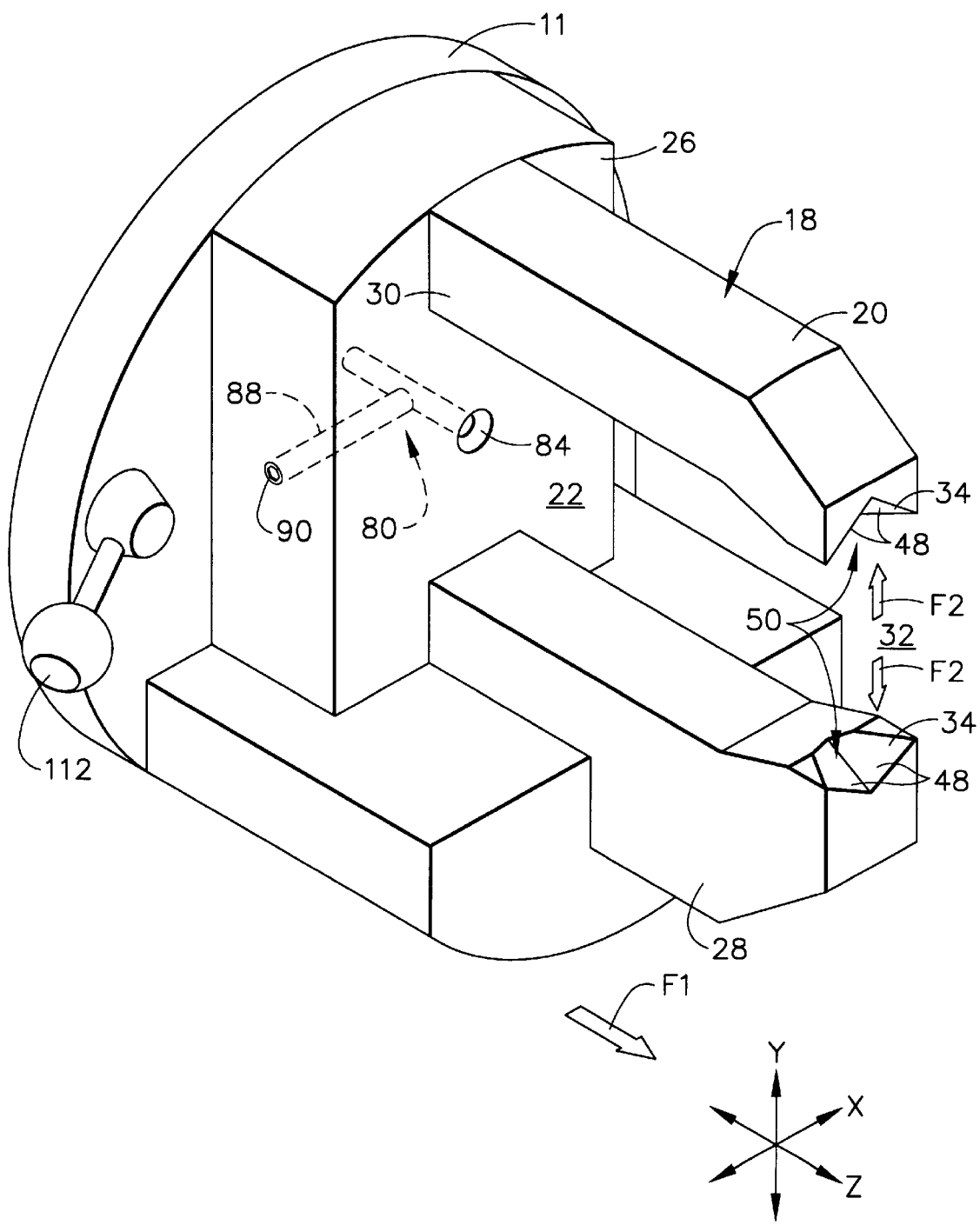
FIG. 3 is a perspective view illustrating, in more detail, the blade holder of the apparatus in FIG. 1.

The apparatus 12 includes a holder 18, which is illustrated in more detail in FIG. 3, to hold the blade 14 within an open ended frame 20 having an open space 22 within for receiving the blade. The frame 20 includes a base 26 and transversely spaced apart first and second members 28 and 30 which longitudinally extend from the base to an open end 32 of the frame at which is located a clamping means in the form of a clamping feature 34 on the end of each one of the first and second members 28 and 30. The clamping feature 34 is used to clamp the blade 14 in the holder 18 with clamping forces in directions along three orthogonal axis, a first axis X, a second axis Y, and a third axis Z. The clamping forces are reaction forces due to translational friction welding pressure applied to the blade 14 through the holder 18 in a first direction F1 to press the airfoil stub 40 of the blade 14 into contact with a rotor stub 42 on a periphery 44 of the rotor 16, the rotor being illustrated herein as a blisk. During translational friction welding, pressure force is applied by the linear friction bonding machine 10 through the holder 18 to the blade 14 in the first direction F1 which is substantially along the third axis Z of the three orthogonal axes.

The clamping feature 34, preferably, has opposing tapering pressure surfaces 48 which open outwardly in the first direction F1 and taper inwardly in a second direction F2 which is perpendicular to the first direction. The preferred embodiment of present invention has the opposing pressure surfaces 48 cut into each of the members 28 and 30 and the opposing pressure surfaces are flat surfaces. Each of the members 28 and 30 has a set of two opposing flat pressure surfaces 48 forming two sides of a pyramidic notch 50 having an open side 52 and an open base 55 and the open sides face each other illustrated in greater detail in FIG. 5.

The blade 14 has contact surfaces 60 oriented to substantially fully contact and conform to the pressure surfaces 48 of the notches 50 that are preferably located on at least one sacrificial feature on the blade. Since the pressure surfaces 48 are flat in this embodiment the contact surfaces 60 are also flat. The sacrificial feature is illustrated as a block 64 which extends around a perimeter 66 of the airfoil 15. The contact surfaces 60 are disposed on the block longitudinally extending first and second distances D1 and D2 from the leading edge LE and the trailing edge TE, respectively. The contact surfaces 60 are preferably planar contact surfaces formed on longitudinally distal block ends 68 at positions on the block generally corresponding to the leading and trailing edges LE and TE, respectively of the blade.

The block ends 68 are compound wedge shaped having first wedge shaped cross-sections 75 in planes parallel 72 and second wedge shaped cross-sections 77 in planes normal 74 to the flat welding surface 41 as shown in FIGS. 4A and 4B, respectively, and at least one inclined or angled side 61. In one exemplary embodiment the angled sides 61 of the first wedge shaped cross-sections 75 are at a first slant angle A1 equal to about 45 degrees and the angled sides 61 of the second wedge shaped cross-sections 77 in planes normal 74 to the flat welding surface 41 are at a second slant angle A2 of about 15 degrees. The planar contact surfaces 60 have compound angles, meaning they lie in planes which essentially intersect the three orthogonal axes. The notch 50 may also be described as having a compound wedge shape with conformal wedge shaped cross-sections conforming to the first wedge shaped cross-sections 75 and the second wedge shaped cross-sections 77 of the block ends 68.

During operation, the flat contact surfaces 60 are wedged against the flat pressure surfaces 48 by the translational friction welding axial pressure force applied to the blade 14 through the holder 18 in the first direction F1 to press the airfoil stub 40, thus, producing clamping forces which hold, secure, and stabilize the blade 14 in the holder 18. The greater the force the greater the clamping forces which are produced by the flared out pressure surfaces 48 of the holder 18 on the flared out contact surfaces 60 on the longitudinally distal block ends 68 of the blade 14. The flared out contact surfaces 60 on the block ends 68 have a pyramidic shape that conforms to the bi-directionally wedge shaped notch 50 cut into the members 28 and 30 and, therefore, the block ends 68 may also be described as a bi-directionally wedge shaped block ends 68. These conforming surfaces of the bi-directionally wedge shaped block ends and notches convert some of the translational friction welding axial pressure force applied to the blade 14 in the first direction F1 into reaction clamping and stabilizing forces which hold and secure the blade to the holder in directions along axes X and Y as well as Z.

The shape of the contact surfaces 60 may also be described as forming flared out block ends 68 which flare out in the first direction F1 and in an outward normal direction to the flat welding surface 41. The flared out block ends 68 conform to what may also be described as flared out pyramidic notches 50 which flare out in the first direction F1 and in the second direction F2 which is perpendicular to the first direction and in the direction of the reciprocating translational motion of the airfoil stub 40 which is in a lengthwise direction of the stub substantially along the Y axis in FIG. 2.

The flared out or wedge shaped ends provide two distinct advantages. The flared out or wedge shaped ends and mating contact surfaces amplify the reaction force from the translational friction welding axial pressure force to provide enhanced clamping and lateral and longitudinal stability. The flared out wedge shaped ends and mating contact surfaces also provide self alignment of the component in the holder.

The holder 18 preferably includes a securing means 80 for securing the blade 14 to the holder, a first type of which is illustrated in FIGS. 1, 3, and 4 a second type of which is illustrated in FIG. 3. The securing means 80 illustrated in FIGS. 2 and 4 includes a sacrificial locating pin 82 longitudinally extending from the airfoil tip 13 away from the airfoil 15 and disposed in a receiving aperture 84 disposed in the base 26. A threaded aperture 88 is disposed in the base 26 and intersects the receiving aperture 84 such that a set screw 90, shown in FIG. 1, can be threading disposed in the threaded aperture to secure the locating pin 82. Thus, the securing means 80 is able to hold and secure the blade 14 by its airfoil tip 13 against vibrations during translational friction welding and during handling when the blade is held in the holder.

Illustrated in FIG. 3 is an alternative securing means 80 having a jaw clamp 100 connected to the base 26 of the frame 20 and constructed so as to clamp the airfoil tip 13 against vibrations during translational friction welding and during handling when the blade is held in the holder. The clamping and securing of the airfoil 15 at its airfoil tip 13 is particularly useful for longer blades and airfoils such as those used on rotors of low pressure compressors and fans as well as other large components that have a tendency to vibrate excessively during translational friction welding.

Referring back to FIG. 1, the base 26 is mounted and secured to a rotatable platform 110 or some other mounting means for rotatably mounting the base to the headstock 11. The rotatable platform 110 is rotatable about a longitudinally extending axis of rotation which generally coincides with the pin 82 and a stacking axis about which the airfoil 15 is twisted. A hand operated lever clamp 112 is used to secure the rotatable platform 110 and provides a means for preventing the platform from rotating during translational friction welding. The direction of this rotation is indicated by curved arrow 114, with respect to the headstock 11. The rotatable platform 110 allows the frame 20 and airfoil 15 to be rotated when the blade 14 in the frame is inserted between the airfoils 15 of adjacent blades 14 on the rotor 16 prior to the translational friction welding process and the frame 20 is retracted from between the airfoils subsequent to the translational friction welding process. The rotatable platform 110 essentially allows a corkscrew motion for insertion and retraction of the frame and holder so that adjacent airfoils on the rotor are not hit and damaged or blemished by the holder, its frame, or the blade in the holder. The rotatable platform 110 also allows proper angular adjustment between the flat welding surface 41 of the airfoil stub 40 with the rotor stub 42.

The present invention includes methods for using the apparatus of the invention for translational friction welding of the blade 14 to the rotor stub 42. One method includes the following steps.

Figure 2:
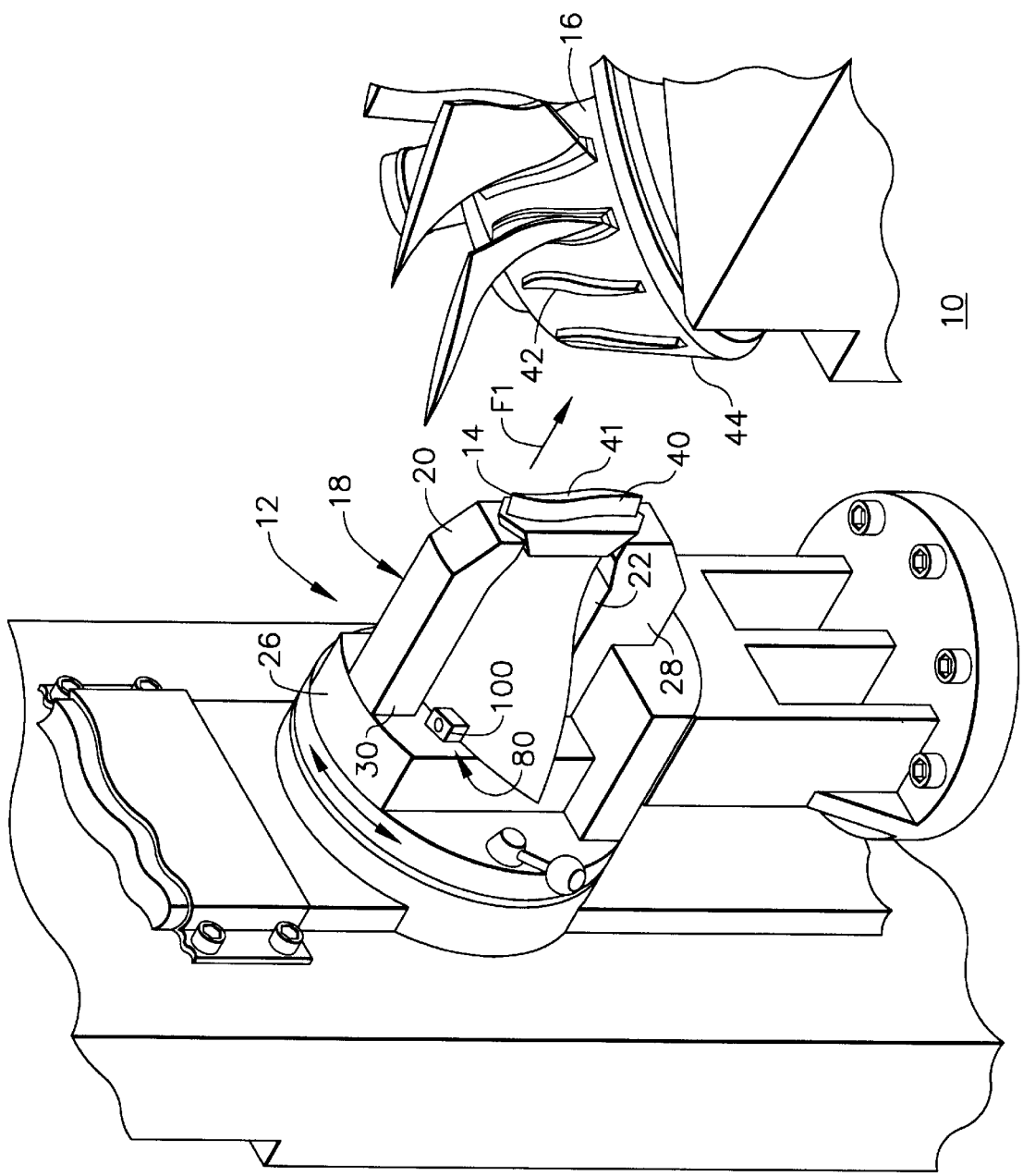
FIG. 2 is a perspective view illustrating a part of a linear friction bonding machine including an alternative apparatus for translational friction welding of a gas turbine engine blade component to a gas turbine engine rotor component in accordance with an alternative embodiment of the present invention.

A) Forming the near net shape blade 14 having;
  1) an airfoil 15 extending chordwise between a leading edge LE and a trailing edge TE of the blade and extending radially between an airfoil tip and airfoil stub,
  2) a flat welding surface 41 on an end of the airfoil stub 40 extending longitudinally from the leading edge LE to the trailing edge TE as illustrated in FIG. 2, and
  3) at least one sacrificial clamping feature, such as block 64 protruding from the blade 14 near the end of the airfoil stub 40, wherein the clamping feature has at least one set of oppositely facing contact surfaces 60 which flare out longitudinally and transversely from the block.

B) Placing the blade in the holder 18 such that the pressure surfaces 48 that conform in shape and orientation to the contact surfaces 60 which are located at the open end of the frame such that the contact surfaces substantially contact the pressure surfaces when the blade is positioned in the holder. Next, the blade is positioned the in the holder such that at least a portion of each of the contact surfaces are in contact with a corresponding portion of the each of the pressure surfaces. Then the airfoil stub is translationally friction welded to the rotor stub by simultaneously applying a pressure force on the holder substantially in the direction normal to the flat welding surface while translating the holder in a reciprocating motion substantially in the lengthwise direction. The sacrificial clamping feature is removed after the welding of the airfoil stub to the rotor stub.

Before the airfoil stub is translationally friction welded to the rotor stub the holder may be inserted between adjacent blades on the rotor by axially moving the stubs together or inserting the frame between the adjacent blades while rotating the rotatable platform 110 so that adjacent airfoils on the rotor are not touched by the holder 20 or by the airfoil 15 within the holder until the stubs are essentially in contact or almost in contact and properly aligned. Then the rotatable platform 110 is secured to the headstock by tightening the lever clamp 112 and after the blade stub 40 is translationally friction welded to the rotor stub 41 the blade 14 is released from the frame by unclamping the clamping means 80. The rotatable platform 110 is then unclamped by unclamping the lever clamp 112 and then the holder is withdrawn from between the airfoils 15 of adjacent blades 14 on the rotor 16 while rotating the rotatable platform 110 so that adjacent airfoils on the rotor are not touched by the holder 20.

The method may include forming the near net shape blade with the clamping feature having a clamping block disposed around a perimeter of the airfoil of the blade and each of the block ends having one set of planar oppositely facing contact surfaces at positions corresponding to the leading and trailing edges of the blade such that the block ends have wedge shaped cross-sections in planes normal to and parallel to the flat welding surface. This clamping feature is removed after the welding of the airfoil stub to the rotor stub.

The method, preferably, includes securing the airfoil to the holder prior to the welding of the airfoil stub to the rotor stub. One method of securing the airfoil includes securing the airfoil to the holder with a sacrificial securing feature on the airfoil that is formed during the formation of the near net shape blade and the securing feature is removed after the welding of the airfoil stub to the rotor stub. The airfoil may be secured to the holder with a securing feature on the airfoil formed during the forming of the near net shape blade and the securing feature is removed after the welding of the airfoil stub to the rotor stub. The securing feature may be a radially extending pin on the airfoil tip and which is at least partially disposed in a locating aperture in a base of the holder and secured to the base by a set screw threadingly tightened in a threaded aperture in the base which is normal to and intersects the locating aperture and the airfoil is secured to the holder by tightening the set screw against the pin.

While the preferred embodiment of our invention has been described fully in order to explain its principles, it is understood that various modifications or alterations may be made to the preferred embodiment without departing from the scope of the invention as set forth in the appended claims.

What is claimed is:

1. An apparatus for translational friction welding of a first component to a second component, said apparatus comprising:
  a holder to hold said first component within an open ended frame having an open space within for receiving said first component, said frame having a base with transversely spaced apart first and second members which longitudinally extend from said base to an open end of said frame, and located at said open end is a clamping means for using translational friction welding pressure to clamp said first component in said holder with clamping forces in directions along three orthogonal axis wherein the clamping forces are reaction forces due to translational friction welding pressure applied to said first component through said holder in a first direction to press said first component into contact with said second component during translational friction welding and wherein said first direction is substantially in direction along one of said three orthogonal directions.

2. An apparatus as claimed in claim 1 further comprising a securing means for securing said first component to said frame.

3. An apparatus as claimed in claim 2 wherein said securing means comprises a clamp.

4. An apparatus as claimed in claim 2 wherein said securing means comprises a receiving aperture, a threaded aperture which intersects said receiving aperture, and a set screw threading disposed in said threaded aperture.

5. An apparatus as claimed in claim 1 wherein said clamping means further comprises opposing tapering pressure surfaces which open outwardly in said first direction and inwardly in a second direction which is perpendicular to said first direction.

6. An apparatus as claimed in claim 5 wherein said opposing pressure surfaces are cut into said members.

7. An apparatus as claimed in claim 6 wherein said opposing pressure surfaces are flat.

8. An apparatus as claimed in claim 7 wherein said members each have a single pyramidic notch bounded at least in part by said flat pressure surfaces.

9. A blade to rotor translational friction welding assembly comprising:

a blade having an airfoil extending longitudinally between an airfoil tip and airfoil stub and extending transversely between a leading edge and a trailing edge of said blade, a holder to hold said blade during translational friction welding of said airfoil stub to a rotor stub on a periphery of a rotor element, said holder having an open ended frame for receiving said blade and an open space within which said airfoil is at least partially located, said frame having a base with transversely spaced apart first and second members which longitudinally extend from said base to an open end of said frame, located at said open end is a clamping means for using translational friction welding pressure to clamp said blade to said frame with clamping forces in three directions along three orthogonal axis wherein the clamping forces are reaction forces due to translational friction welding pressure applied to said blade through said holder in a first direction to press said airfoil stub into contact with said rotor stub during translational friction welding, said first direction normal to a flat welding surface on bottom of said airfoil stub, said clamping means comprising opposing tapering pressure surfaces which open outwardly in said first direction and inwardly in a second direction which is perpendicular to said first direction, and said blade having contact surfaces oriented to substantially fully contact said pressure surfaces.

10. An assembly as claimed in claim 9 wherein said contact surfaces are located on at least one sacrificial feature on said blade.

11. An assembly as claimed in claim 9 further comprising a rotatable platform to which said base is secured and said rotatable platform is rotatable about a longitudinally extending axis of rotation.

12. An assembly as claimed in claim 9 further comprising an anti rotation means for preventing said platform from rotating about said axis of rotation during welding.

13. An assembly as claimed in claim 10 wherein said sacrificial feature is a block which extends around a perimeter of said airfoil and said contact surfaces are disposed on said block a longitudinally extending distance from one of said leading and trailing edges.

14. An assembly as claimed in claim 13 wherein said contact surfaces are planar and formed on longitudinally distal block ends at positions on said block generally corresponding to said leading and trailing edges of said blade such that said block ends are compound wedge shaped having first wedge shaped cross-sections in planes parallel to said flat welding surface and second wedge shaped cross-sections in planes normal to said flat welding surface.

15. An assembly as claimed in claim 14 wherein said members each have a single pyramidic notch bounded at least in part by said flat pressure surfaces.

16. An assembly as claimed in claim 14 further comprising a securing means for securing said blade to said frame.

17. An assembly as claimed in claim 16 wherein said securing means comprises a clamp constructed to clamp said airfoil tip.

18. An assembly as claimed in claim 16 wherein said securing means comprises a locating pin longitudinally extending from said airfoil tip away from said airfoil and disposed in a receiving aperture in said base, a threaded aperture in said base which intersects said receiving aperture, and a set screw threading disposed in said threaded aperture.

19. A method for translational friction welding of a blade to a rotor element, said method comprising the following steps:

forming a near net shape blade having, an airfoil extending chordwise between a leading edge and a trailing edge of the blade and extending radially between an airfoil tip and airfoil stub, a flat welding surface on an end of the airfoil stub, the flat welding surface extending lengthwise and widthwise, at least one sacrificial clamping feature protruding from the blade near the end of the airfoil stub, the clamping feature having at least one set of oppositely facing contact surfaces and which tapers down widthwise in the lengthwise direction outward from the blade and widthwise and lengthwise in a direction normal to the flat welding surface;

placing the blade in a holder having, an open ended frame and an open space therein for receiving the airfoil of the blade and pressure surfaces that conform in shape and orientation to the contact surfaces are located at the open end of the frame such that the contact surfaces substantially contact the pressure surfaces when the blade is positioned in the holder;

positioning the blade in the holder such that at least a portion of each of the contact surfaces are in contact with a corresponding portion of the each of the pressure surfaces;

welding the airfoil stub to the rotor stub by simultaneously applying a pressure force on the holder substantially in the direction normal to the flat welding surface while translating the holder in a reciprocating motion substantially in the lengthwise direction.

20. A method as claimed in claim 19, wherein the near net shape blade is formed with the clamping feature having a clamping block disposed around a perimeter of the airfoil and each of the block ends has one set of planar oppositely facing contact surfaces at positions corresponding to the leading and trailing edges of the blade such that the block ends are compound wedge shaped having wedge shaped cross-sections in planes normal to and parallel to the flat welding surface.

21. A method as claimed in claim 20, wherein the at least one clamping feature is removed after the welding of the airfoil stub to the rotor stub.

22. A method as claimed in claim 21, wherein the airfoil is secured to the holder prior to the welding of the airfoil stub to the rotor stub.

23. A method as claimed in claim 22, wherein the airfoil is secured to the holder with a securing feature on the airfoil formed during the forming of the near net shape blade and the securing feature is removed after the welding of the airfoil stub to the rotor stub.

24. A method as claimed in claim 22, wherein the securing feature is a radially extending pin on the airfoil tip and which is at least partially disposed in a locating aperture in a base of the holder and secured to the base by a set screw threadingly tightened in a threaded aperture in the base which is normal to and intersects the locating aperture and wherein the airfoil is secured to the holder by tightening the set screw against the pin.

25. A method as claimed in claim 19, wherein the at least one sacrificial clamping feature is removed after the welding of the airfoil stub to the rotor stub.

26. A method as claimed in claim 25, wherein the airfoil is secured to the holder prior to the welding of the airfoil stub to the rotor stub.

27. A method as claimed in claim 26, wherein the airfoil is secured to the holder with a securing feature on the airfoil formed during the forming of the near net shape blade and the securing feature is removed after the welding of the airfoil stub to the rotor stub.

28. A method as claimed in claim 27, wherein the securing feature is a radially extending pin on the airfoil tip and which is at least partially disposed in a locating aperture in a base of the holder and secured to the base by a set screw threadingly tightened in a threaded aperture in the base which is normal to and intersects the locating aperture and wherein the airfoil is secured to the holder by tightening the set screw against the pin.

* * * * *